United States Patent [19]
Saito

[11] Patent Number: 4,730,341
[45] Date of Patent: Mar. 8, 1988

[54] EQUALIZER AND EQUALIZING CIRCUIT USING THE SAME

[75] Inventor: Kazuo Saito, Amagasaki, Japan

[73] Assignee: Mitsubishi Denki Kabushiki Kaisha, Japan

[21] Appl. No.: 897,979

[22] Filed: Aug. 19, 1986

[30] Foreign Application Priority Data

Aug. 20, 1985 [JP] Japan ................................ 60-184402
Aug. 20, 1985 [JP] Japan ................................ 60-184403
Aug. 20, 1985 [JP] Japan ................................ 60-184404

[51] Int. Cl.$^4$ ............................................. H03H 7/30
[52] U.S. Cl. ....................................... 375/11; 333/18; 370/77
[58] Field of Search ......................... 375/11, 12, 13, 14, 375/15, 16; 333/18; 364/724; 370/77, 78, 79, 112

[56] References Cited

U.S. PATENT DOCUMENTS

| | | | |
|---|---|---|---|
| 2,805,398 | 9/1957 | Albersheim | 375/11 |
| 3,391,604 | 7/1968 | Appleby | 408/83.5 |
| 3,992,616 | 11/1976 | Acker | 333/18 |
| 4,027,257 | 5/1977 | Perreault | 375/12 |
| 4,261,051 | 4/1981 | Ohnishi et al. | 370/58 |
| 4,320,526 | 3/1982 | Gitlin | 370/79 |
| 4,351,060 | 9/1982 | Treiber | 375/12 |
| 4,377,858 | 3/1983 | Treiber | 375/14 |
| 4,386,430 | 5/1983 | Treiber | 375/14 |
| 4,455,649 | 6/1984 | Esteban et al. | 370/80 |
| 4,481,643 | 11/1984 | Kitazawa | 375/12 |

FOREIGN PATENT DOCUMENTS

| | | |
|---|---|---|
| 2086198 | 5/1982 | United Kingdom . |
| 2128856 | 2/1984 | United Kingdom . |
| 2135857 | 9/1984 | United Kingdom . |

*Primary Examiner*—Jin F. Ng
*Assistant Examiner*—Stephen Chin
*Attorney, Agent, or Firm*—Lowe, Price, LeBlanc, Becker & Shur

[57] ABSTRACT

An equalizing circuit comprises a hopping-type amplitude equalizer (70) for changing the characteristics of burst signals inputted sequentially thereto to desired characteristics. The output of the equalizer (70) is distributed by a distributor (23) to a desired number of paths. Each output path of the distributor (23) is provided with a hopping switch (25a, 25b, or 25c), which is operated in synchronism with the amplitude equalizer (70).

Consequently, even if the number of signal paths is increased, the number of equalizers required is smaller than the number of signal paths.

20 Claims, 17 Drawing Figures

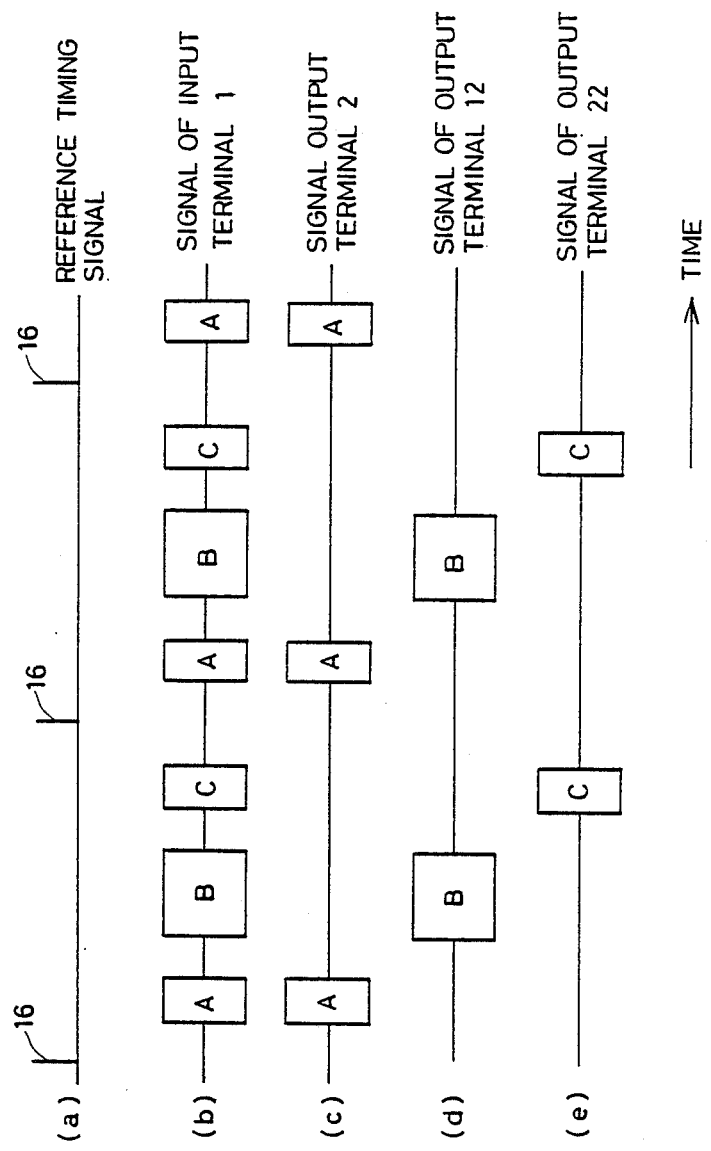

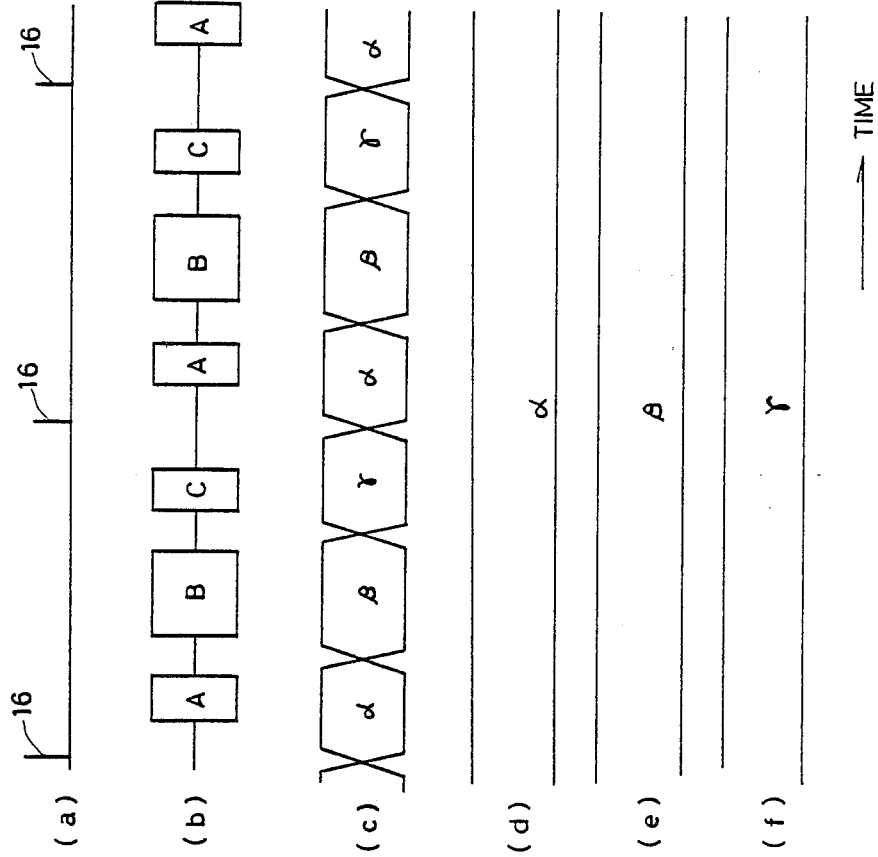

EQUALIZER AND EQUALIZING CIRCUIT USING THE SAME

BACKGROUND OF THE INVENTION

1. Field of the Invention

The present invention relates to an equalizing circuit and an equalizer included in said equalizing circuit for compensation for distortion or other deterioration in the signal characteristics in a signal transmission line. More particularly, the present invention relates to an equalizing circuit adapted to be provided in a signal transmission line for transmitting signals of a time division multiplex access system or the like in a time dividing manner.

2. Description of the Prior Art

FIG. 1 is a block diagram showing an example of the construction of a conventional equalizing circuit 12 provided in a time division multiplex access (TDMA) system for allotting the time for transmission and reception to the respective associated regions in case of a satellite broadcast and the like. In FIG. 1, an input terminal 1 is connected to a distributor 3. The distributor 3 distributes the input signal to a desired number of paths. Output terminals of the distributor 3 are connected with circuits each comprising an equalizer 4 and a hopping switch 5 connected in series. In FIG. 1, an equalizer and a hopping switch in each path are denoted by reference numerals 4 and 5, respectively, plus characters a, b or c after the numerals for identifying each path. The hopping switches 5a, 5b and 5c are selectively enabled by a selection signal applied from a control input terminal 6. Accordingly, prescribed signals are obtained at the output terminals 2a, 2b and 2c in a time dividing manner.

FIG. 2 is a schematic block diagram of the whole construction of a TDMA system for explaining the operation state of the equalizing circuit 12 in FIG. 1 in the TDMA system. Referring to FIG. 2, the operation of the whole TDMA system will be briefly described.

A TDMA common terminal equipment 11 changes a plurality of signals to be transmitted to pulse signals and sends those pulse signals with a fixed cycle according to a reference timing signal. The equalizing circuit 12 distributes the pulse signals supplied thereto serially from the TDMA common terminal equipment 11 to a plurality of paths according to the kinds of the signals. At this time, the equalizing circuit 12 equalizes the distortions in the amplitude and the group delay of the signals so that the respective signals may be adapted for the corresponding paths.

The pulse signals distributed to the respective paths are transmitted from the transmitters 13a, 13b and 13c to the respective destinations, namely, an X station 15a, a Y station 15b, and a Z station 15c through transponders 14a, 14b and 14c provided in a communication satellite corresponding to the respective paths.

FIG. 3 is a timing chart of signals for explaining the operation of the equalizing circuit 12 in FIG. 1. Referring to FIG. 3, the operation of the equalizing circuit 12 in FIG. 1 will be specifically described.

The signal applied to the input terminal 1 is as shown in FIG. 3 (b). This signal is supplied with a fixed cycle according to the reference timing signal 16 shown in FIG. 3 (a) and is distributed through the distributor 3 to three paths so that the signals shown in FIG. 3 (b) are outputted from the respective output terminals. The equalizers 4a, 4b and 4c change the characteristics of the signals for the respective paths based on predetermined coefficients. The hopping switches 5a, 5b and 5c connected to the equalizers 4a, 4b and 4c, respectively, are selectively enabled so that only the signals necessary for the respective paths are extracted based on the hopping control signal supplied from the TDMA common terminal station 11 (as shown in FIG. 2) through a control signal input terminal 6. As a result, signals as shown in FIG. 3 (c), 3 (d) and 3(e) are outputted from the output terminals 2a, 2b and 2c, respectively.

The above stated equalizing circuit 12 in the TDMA system functions to equalize the signal transmission characteristics in the respective signal paths, such as the amplitude frequency response characteristics or the group delay frequency response characteristics in the respective paths. However, the amplitude frequency response characteristics and the group delay frequency response characteristics are different for each signal path, in other words, for each transmitter 13 or each transponder 14. For this reason, it is necessary to connect an equalizer for each signal path and to make equalization so that the signal characteristics adapted for each signal path can be obtained. Consequently, the conventional equalizing circuit is required to have equalizers the number of which is equal to the paths for signals to be transmitted and there is posed a problem because it is necessary to increase the number of the equalizers according to the increase of the number of the signal paths.

SUMMARY OF THE INVENTION

Therefore, an object of the present invention is to provide an equalizing circuit which can be formed by equalizers the number of which is smaller than the number of signal paths.

Another object of the present invention is to provide an equalizer which is most suitably adapted for a time division communication system or the like and which is capable of setting arbitrarily the equalizing characteristics as a function of time in a time division manner.

The first aspect of the invention is an equalizing circuit comprising equalizers for changing the characteristics of the sequentially inputted burst signals to desired characteristics in a time division manner before the burst signals are distributed to a desired number of paths, so that the outputs of the above stated equalizers are provided through a switching circuit which performs switching operation in synchronism with the time dividing operation of the equalizers.

The burst signals to be distributed to a plurality of paths are changed to have prescribed characteristics in a time division manner by means of equalizers provided forwardly of the distributor. Then, the burst signals having changed characteristics are selected by the switching circuit so that only the necessary signals for the respective signal paths are provided.

Thus, according to the first embodiment of the invention of this application, an equalizing circuit having a small number of components can be manufactured simply and at low cost because even if the number of signal paths is increased, this equalizing circuit can be adapted for such increase by time division operation of a smaller number of equalizers than the number of signal paths without increasing the number of equalizers.

Particularly, the first embodiment provides an equalizing circuit suited for use in a time division multiplex communication network.

The second embodiment of this application comprises coefficient setting means for setting a plurality of coefficients for amplification or attenuation of input signals so that any of the coefficients set by the coefficient setting means is selectively supplied to coefficient applying means.

The level of a signal set by the coefficient setting means such as level adjusters or a signal stored in RAM is supplied to the coefficient applying circuit through a switching circuit functioning as the selecting means. The coefficient applying circuit sets a coefficient according to the signal level supplied thereto and changes the characteristics of the signal to be transmitted. The operation of the switching circuit enables the coefficient applying circuit to change the characteristics of the signal to be transmitted in a time division manner.

Thus, according to the second embodiment of the invention, an equalizer is capable of changing the compensation characteristics according to the passage of time. Particularly, the second embodiment makes it possible to provide an equalizer most suitably interposed in a signal transmission line of a time division multiplex access system.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart for explaining the operation of hopping switches.

FIG. 5 is a timing chart for explaining the operation of the first embodiment of the present invention as well as the operation of a conventional equalizing circuit.

DESCRIPTION OF THE REFERRED EMBODIMENTS

Figure 4:
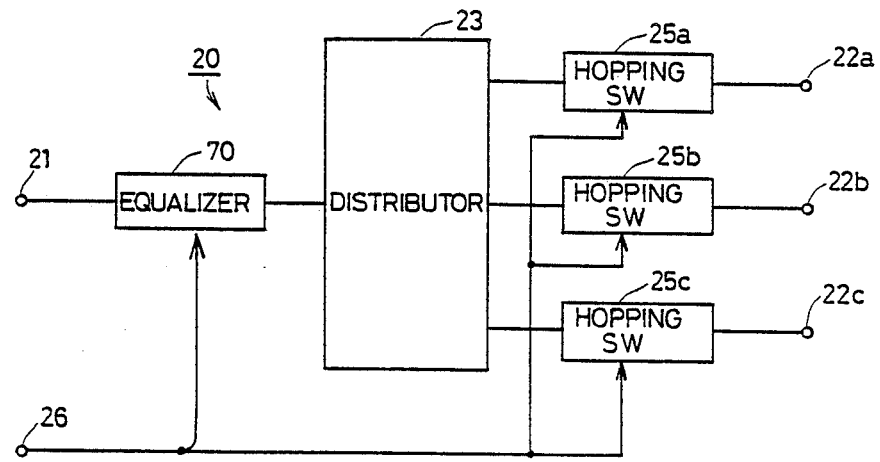
FIG. 4 is a block diagram showing a configuration of an equalizing circuit in accordance with a first embodiment of the present invention.

FIG. 4 is block diagram showing a circuit configuration of an equalizing circuit of an embodiment of the present invention. A characteristic feature of the equalizing circuit 20 of this embodiment is that an equalizer 70 is provided on the input side of a distributor 23 so that the equalizer 70 operates in a time division manner by a selection signal supplied from a control signal input terminal 26.

The configuration and the operation of the equalizing circuit 20 of this embodiment will be described with reference to the operation timing chart in FIG. 5.

A signal supplied from an input terminal 21 is received by the hopping type equalizer 70. The amplitude frequency response characteristic and the group delay frequency response characteristic of the hopping type equalizer 70 are selected in a time division manner based on a selection signal supplied from the control signal input terminal 26. More specifically, as shown in FIG. 5 (c), the amplitude frequency response characteristics and the group delay frequency response characteristics of the hopping type equalizer 70 are changed as $\alpha$, $\beta$ and $\gamma$ as the time proceeds. This change of the characteristics according to the passage of time is made in synchronism with the selection of pulse signals A, B and C in FIG. 5(b). Accordingly, compensation for the characteristics such as amplitude frequency response or group delay frequency response required for the respective pulse signals A, B and C is performed in a time dividing manner.

Figure 1:
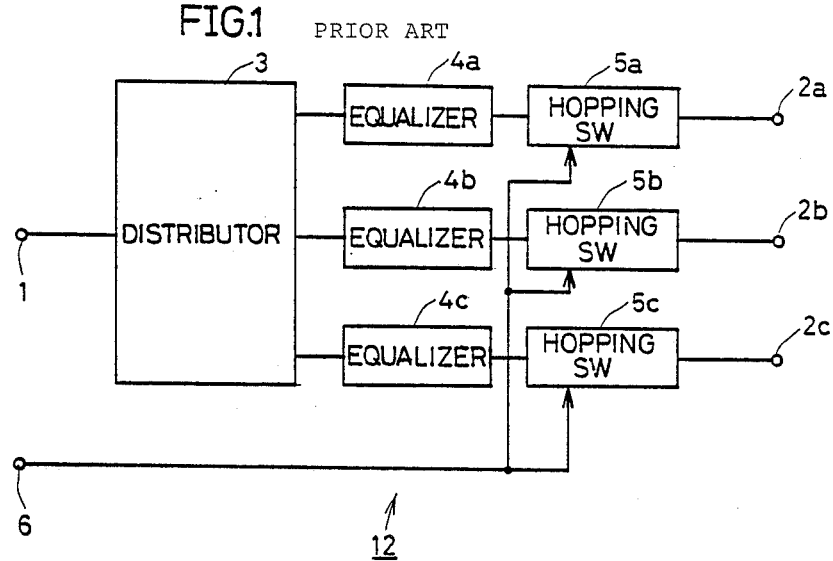
FIG. 1 is a block diagram showing a configuration of a conventional equalizing circuit.
Figure 2:
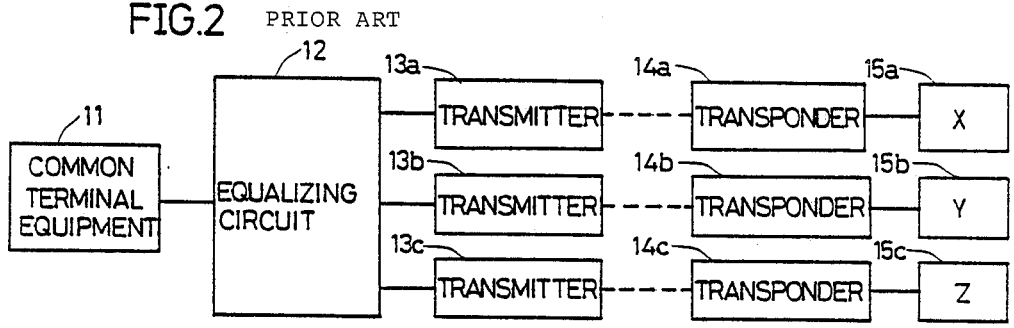
FIG. 2 is a schematic block diagram of a TDMA system for explaining the operation state of an equalizing circuit in the TDMA system.

The equalizers 4a, 4b and 4c of the conventional circuit (shown in FIG. 1) equalize the pulse signal A sequentially by the characteristic $\alpha$, the pulse signal B sequentially by the characteristic $\beta$ and the pulse signal C sequentially by the characteristic $\gamma$, respectively, as shown in (d), (e) and (f) of FIG. 5 for the respective signal paths and after that the equalized signals are extracted by the hopping switches 5a, 5b and 5c at desired timing.

In this embodiment, the hopping type equalizer equalizes the signals by the characteristic $\alpha$, $\beta$ and $\gamma$ in a time division manner and after that the signals are distributed by the distributor 23 so that the signals are extracted at desired timing by the hopping switches 25a, 25b and 25c provided in the respective transmission paths. As a result, the signals equivalent to those in the conventional circuit are obtained at the output terminals 22a, 22b and 22c.

Although the equalizing circuit of a transmission system was described in the above embodiment, an equalizing circuit of a receiving system may be formed by equalizers the number of which is smaller than the number of signal paths, by providing input and output terminals oppositely to reverse the flow of the signals.

Figure 6:
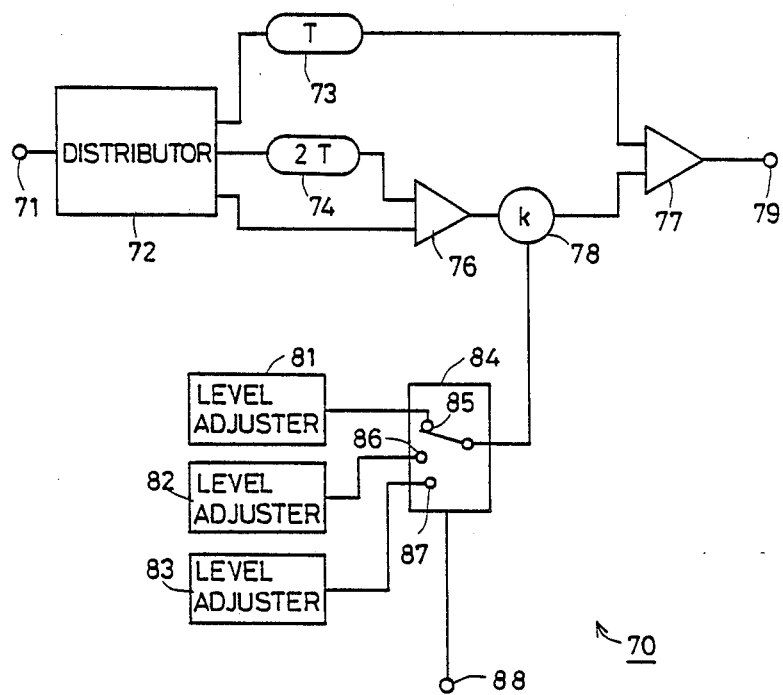
FIG. 6 is a block diagram of a hopping type amplitude equalizer in accordance with a second embodiment of the present invention.

FIG. 6 is a circuit block diagram showing a detailed construction of an equalizer applied to the above described equalizing circuit 20. Referring to FIG. 6, the transversal amplitude equalizer 70 comprises an input terminal 71, a distributor 72, delay lines 73 and 74, synthesizers 76 and 77, a coefficient applying circuit 78 and an output terminal 79.

A transmitted signal applied to the input terminal 71 is distributed by the distributor 72 into three signals. The first signal is applied to the synthesizer 77 as a main signal delayed by "T" seconds through the delay line 73. The second signal is applied to the synthesizer 76 delayed by "2T" seconds through the delay line 74. The third signal is applied directly to the synthesizer 76. A synthesized signal obtained by synthesizing the second and third signals in the synthesizer 76 is made to have a prescribed coefficient by the coefficient applying circuit 78 including polarity reversal and then it is applied to the synthesizer 77. The main signal and the output of the coefficient applying circuit 78 are synthesized in the synthesizer 77 and the synthesized signal is provided from the output terminal 79 as an output signal.

The equalizer 70 is characterized in that the coefficient applying circuit 78 can be controlled at high speed by externally applied voltage (or electric current) and that the signal characteristics can be changed in a time division manner by regulating the externally supplied voltage. A circuit for regulating the voltage comprises level adjusters 81, 82 and 83 in which different voltages are set, a selection switch 84 for selecting the level adjusters 81 to 83 and a hopping control signal input terminal 88 for controlling the selection timing of the selection switch 84.

Prescribed voltages A, C and E (A<C<E in this embodiment) are set in the level adjusters 81 and 83, respectively.

Figure 7:
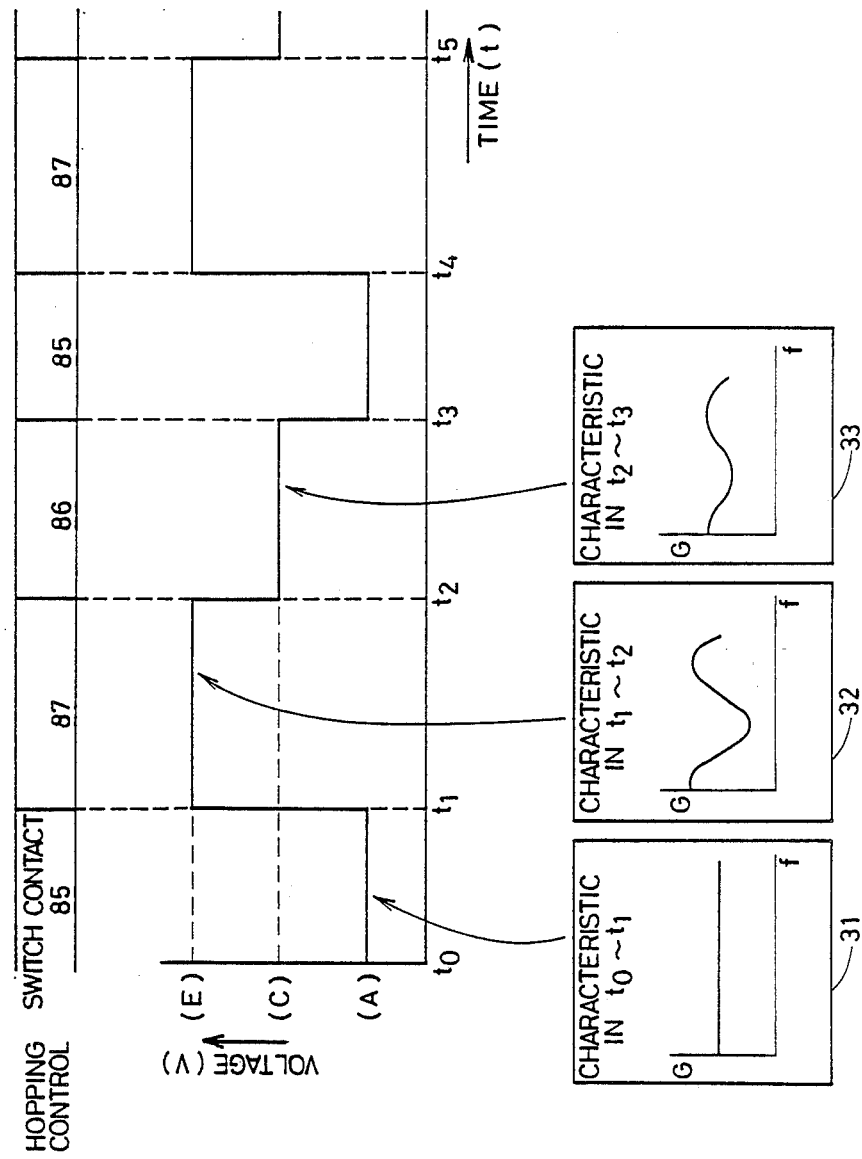
FIG. 7 is a diagram for explaining the operation of the second embodiment of the present invention.

FIG. 7 is a waveform diagram for explaining the operation of the equalizer 70 in FIG. 6. Referring to FIG. 7, the operation of the equalizer 70 will be described.

A transmitted signal applied to the input terminal 71 is distributed by the distributor 72 into three signals. Those signals undergo changes in the delay line 73, the delay line 74, and the synthesizer 76 together with the coefficient applying circuit 78, respectively, and then they are synthesized by the synthesizer 77 and the synthesized signal is outputted from the output terminal 79. The outputted signal can be made to have desired characteristics by changing the coefficient "k" of the coefficient applying circuit 78.

More specifically stated, assuming that the signals are not amplified or attenuated in any circuit other than the coefficient applying circuit 78, that there is no delay in time in the signals through any line other than the delay lines 73 and 74, and that the delay in the main signal is regarded as "0" as a reference, the output signal $A(\omega)$ is represented by the following equation.

$$A(\omega) \text{ equal} = \cos \omega t + k \cos \omega (t + T) + k \cos \omega (t - T)$$
$$= (1 + 2k \cos \omega T) \cos \omega t$$

k; coefficient of the coefficient applying circuit 78
$\omega$; angular frequency
t; time
T; delay time The amplitude frequency response characteristic $G_A(\omega)$ of the output signal $A(\omega)$ is as follows.

$$G_A(\omega) = 20 \log (1 + 2k \cos \omega t)$$

Figure 8:
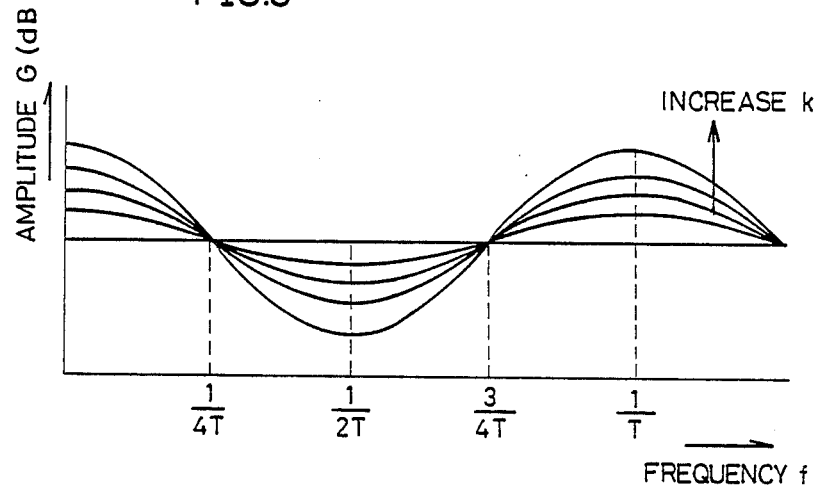
FIG. 8 is a waveform diagram showing characteristics of an amplitude equalizer.

The changes of the amplitude frequency response characteristic $G_A(\omega)$ with respect to the coefficient "k" are as shown in FIG. 8. As can be seen from FIG. 8, the amplitude of the output signal increases in the arrow direction when the coefficient "k" increases. Thus, the equalizer 70 is capable of changing the amplitude of the output signal by varying the coefficient "k".

In this equalizer 70, the coefficient "k" of the coefficient applying circuit 78 is not constant independently of the time. The coefficient "k" is controlled as a function of the time. More specifically, the selection switch 84 is controlled by a control signal from the hopping control signal input terminal 88, as shown in FIG. 7, in a manner in which: the switch contact 85 is selected during a period from the time t0 to the time t1; the switch contact 87 is selected during a period from the time t1 to the time t2; and the switch contact 86 is selected during a period from the time t2 to the time t3. Subsequently, such control is repeated. Thus, the control voltage applied to the coefficient applying circuit 78 changes periodically as the time proceeds. More specifically, a voltage A set by the level adjuster 81 is applied to the coefficient applying circuit 78 in the time period from t0 to t1; a voltage E set by the level adjuster 83 is applied thereto in the time period from t1 to t2; a voltage C set by the level adjuster 82 applied thereto in the time period from t2 to t3; and subsequently such operation is repeated. Accordingly, the amplitude frequency response characteristic of the output signal obtained at the output terminal 79 becomes as shown in the illustration 31 in FIG. 7 in the the time period from t0 to t1; it becomes as shown in the illustration 32 in the time period from t1 to t2; and it becomes as shown in the illustration 33 in the time period from t2 to t3.

Thus, the amplitude frequency response characteristic of the signal outputted from the output terminal 79 can be varied in a time division manner by controlling the selection timing of the selection switch 84 based on the control signal supplied from the hopping control signal input terminal 88.

Although the amplitude equalizer 70 was described above, any variable equalizer may be used as far as it has a coefficient applying circuit which can be switched at high speed (for example, a variable group delay equalizer may be used).

Figure 9:
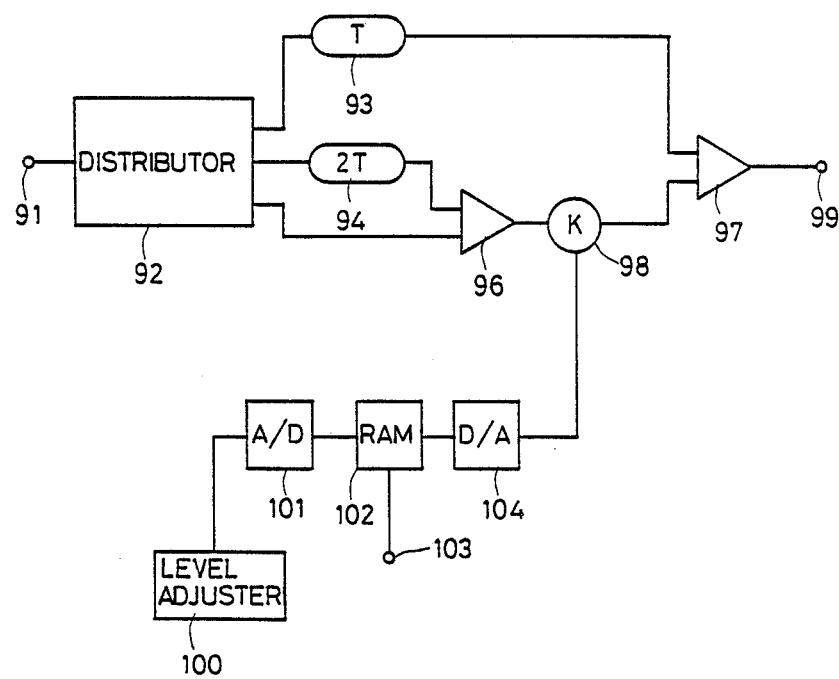
FIG. 9 is a block diagram of a hopping type amplitude equalizer of a third embodiment of the present invention.

FIG. 9 is a circuit block diagram showing an equalizer having another construction which is applied to the above described equalizing circuit 20. Referring to FIG. 9, the transversal amplitude equalizer 90 comprises an input terminal 91, a distributor 92, delay lines 93 and 94, synthesizers 96 and 97, a coefficient applying circuit 98 and an output terminal 99. Those components are the same as in the equalizer 70 described above with reference to FIG. 6.

This equalizer 90 is characterized in that a circuit for controlling the voltage in the coefficient applying circuit 98 comprises a RAM 102 in which a plurality of voltage values are written as digital values, a level adjuster 100 for setting voltage values to be written in the RAM, a hopping control signal input terminal 103 for controlling writing and reading modes and writing and reading addresses in the RAM, an analog-to-digital converter 101, and a digital-to-analog converter 104.

Figure 10:
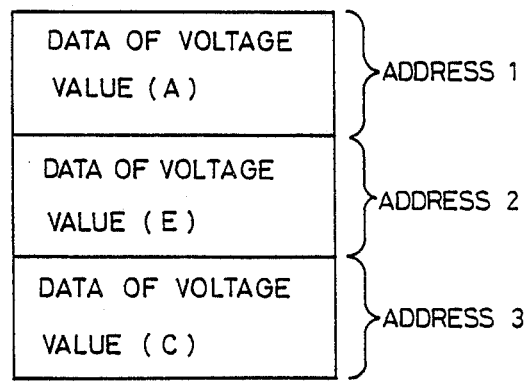
FIG. 10 is a memory map of RAM 12.

The RAM 102 includes an address 1, an address 2 and an address 3 in which data of a voltage value A, data of a voltage value E and data of a voltage value C are written in advance, respectively, as shown in FIG. 10. The writing of the data of the voltage values A, E and C in the addresses 1, 2 and 3 in the RAM 102 is made in the following manner. The write mode is set and the write address is designated in the RAM 102 by the signal from the hopping control signal input terminal 103 and then a voltage (for example, the voltage A) is set by the level adjuster 100 and this voltage is converted to a digital value by the analog-to-digital converter 101, so that the digital value is written in the RAM 102. The data of other voltages E and C are written in the same manner. In addition, the data written in the respective addresses 1, 2 and 3 can be rewritten to any other values by the same operation as described above.

In the above described embodiment, the level adjuster 100 sets an analog voltage and the analog voltage is converted to a digital value by the analog-to-digital converter 101 so as to be written in the RAM 102. However, it goes without saying that the level adjuster may set a digital voltage value and in this case the analog-to-digital converter 101 can be omitted.

Figure 11:
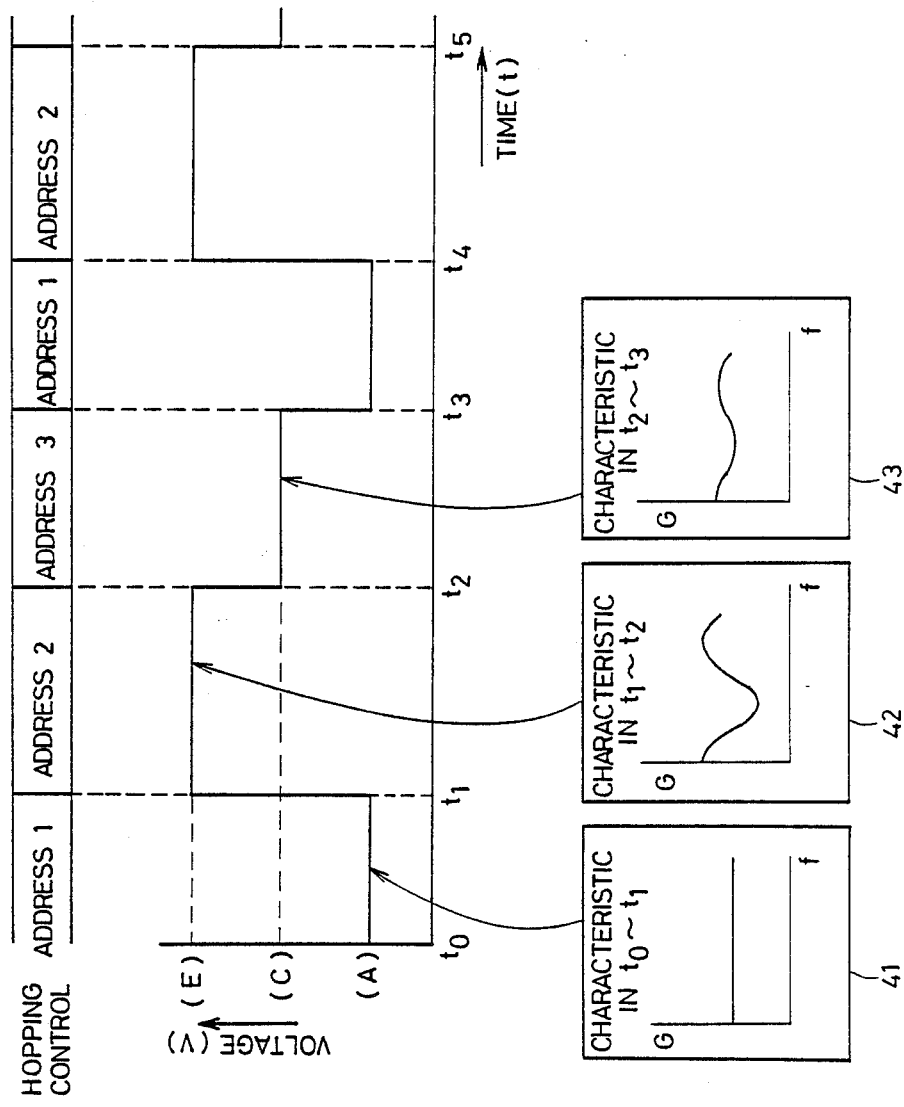
FIG. 11 is an illustration for explaining the operation and the characteristics of the third embodiment of the present invention.

Time division control by the coefficient "k" of the coefficient applying circuit 98 in the equalizer 90 in FIG. 9 is performed in the following manner. The read mode is set in the RAM 102 by the control signal from the hopping control signal input terminal 103 and as shown in FIG. 11, the address 1 in the RAM 102 is designated in the time period from t0 to t1, the address 2 is designated in the time period from t1 to t2 and the address 3 is designated in the time period from t2 to t3. After the time t4, the addresses 1 to 3 are selected in succession repeatedly by the control signal with the same cycle as described above. As a result, the control voltage supplied to the coefficient applying circuit 98 changes cyclically as the time proceeds. More specifically, the voltage A is applied in the time period from t0 to t1, the voltage E is applied in the time period from t1 to t2 and the voltage c is applied in the time period from t2 to t3; and subsequently, the same operation is repeated. Therefore, the amplitude frequency response characteristic of the output signal obtained at the output terminal 99 is as shown in the illustration 41 in FIG. 11 in the time period from t0 to t1; it is as shown in the illustration 42 in the time period from t1 to t2; and it is as shown in the illustration 43 in the time period from t2 to t3.

Thus, the amplitude frequency response characteristic of the signal outputted from the output terminal 99 can be changed in a time dividing manner by cyclically selecting read addresses in the RAM 102 based on the hopping control signal.

Figure 12:
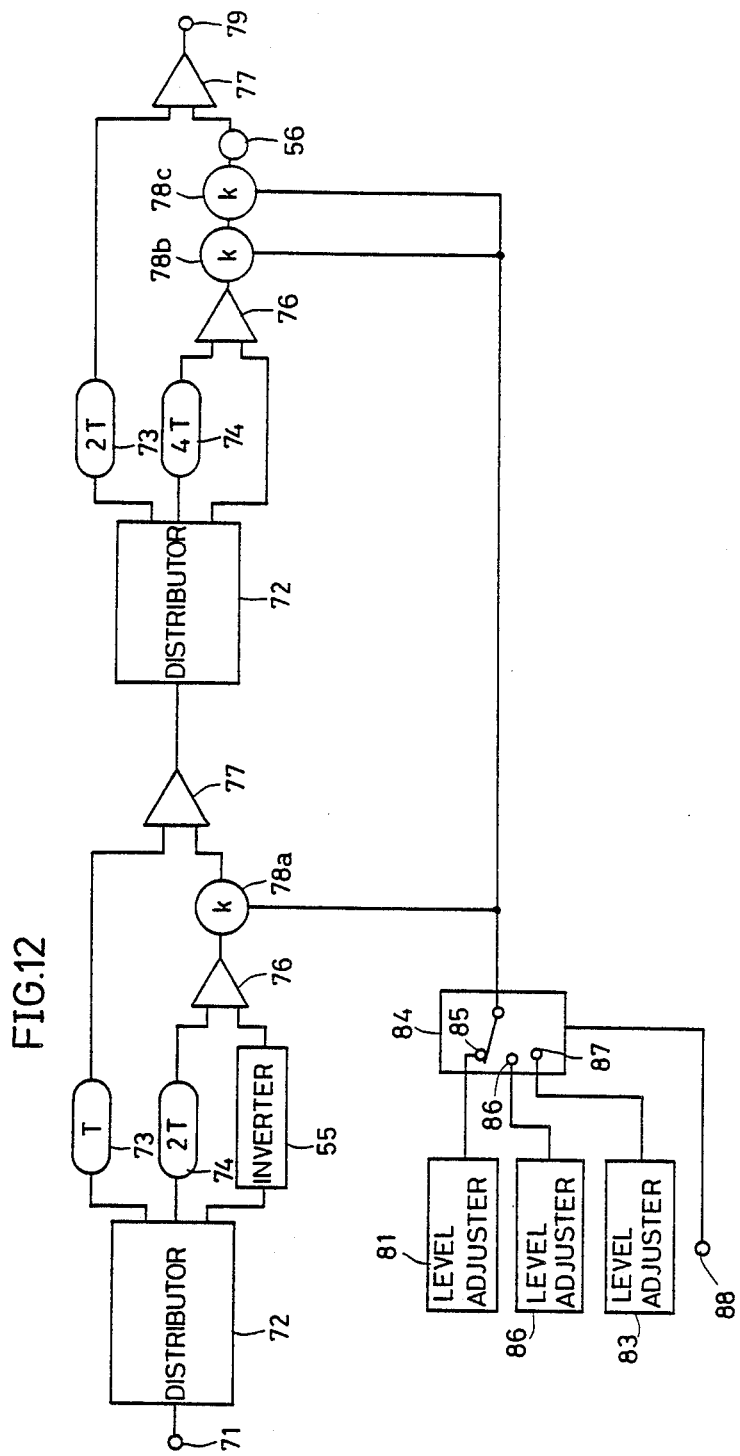
FIG. 12 is a block diagram showing a group delay equalizer of a fourth embodiment of the present invention.
Figure 13:
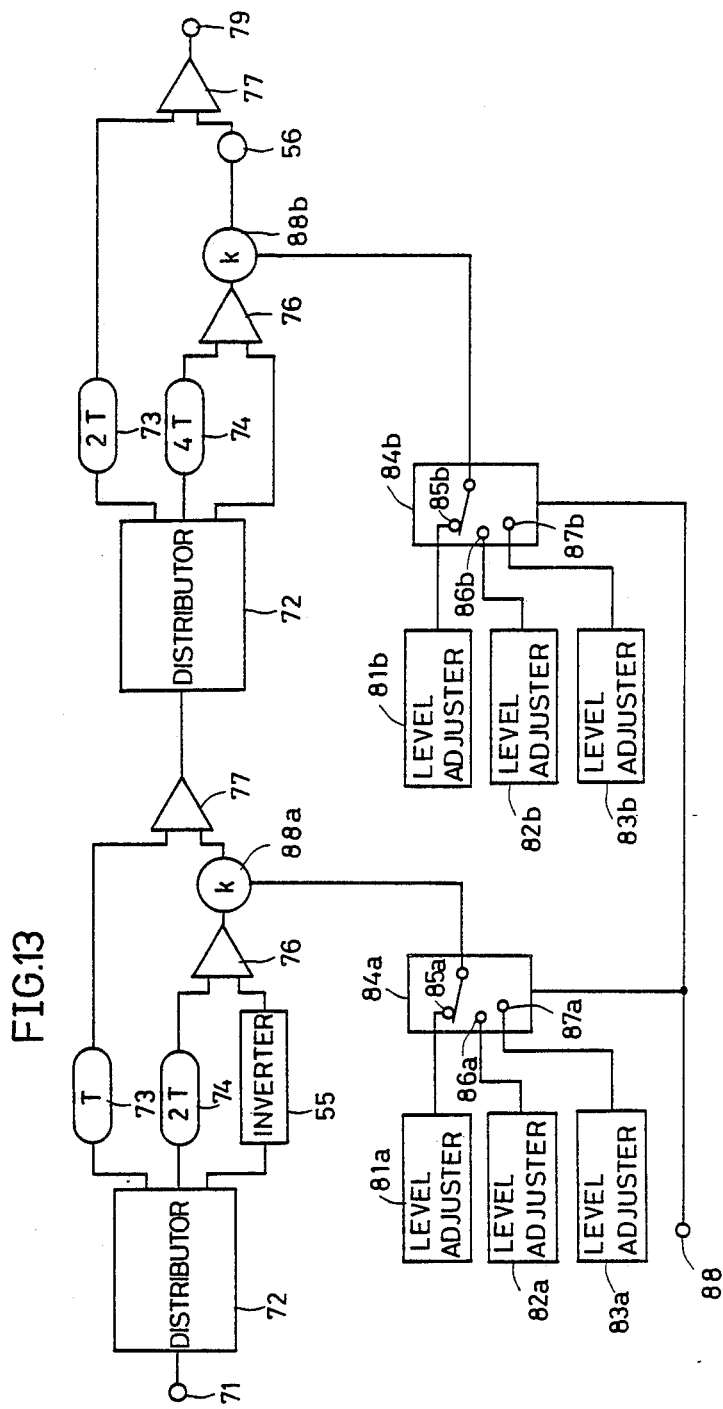
FIG. 13 is a block diagram showing an equalizer of a fifth embodiment of the present invention.

FIG. 12 is a block diagram showing another construction example of an equalizer in an embodiment of the present invention. In this equalizer, a plurality of coefficient applying circuits 78a, 78b and 78c can be simultaneously controlled by a group of a level adjusters and a switching circuit. In addition, in FIG. 13 there are provided a plurality of level adjusters 81 to 83 (in which different voltages may be set or the same voltage may be set) and a plurality of selection switches 84 (the reference characters a and b being attached to the level adjusters 81 to 83 and the selection switches 84 for identifying the respective groups), so that a plurality of coefficient applying circuits 88a and 88b can be controlled simultanously by a common hopping control signal supplied from the hopping control signal input terminal 88. In FIGS. 12 and 13, the reference numeral 55 denotes a polarity inverting circuit and the reference numeral 56 denotes a fixed attenuater. As for other components, the same numerals as in FIG. 6 denote the same or corresponding components.

Figure 14:
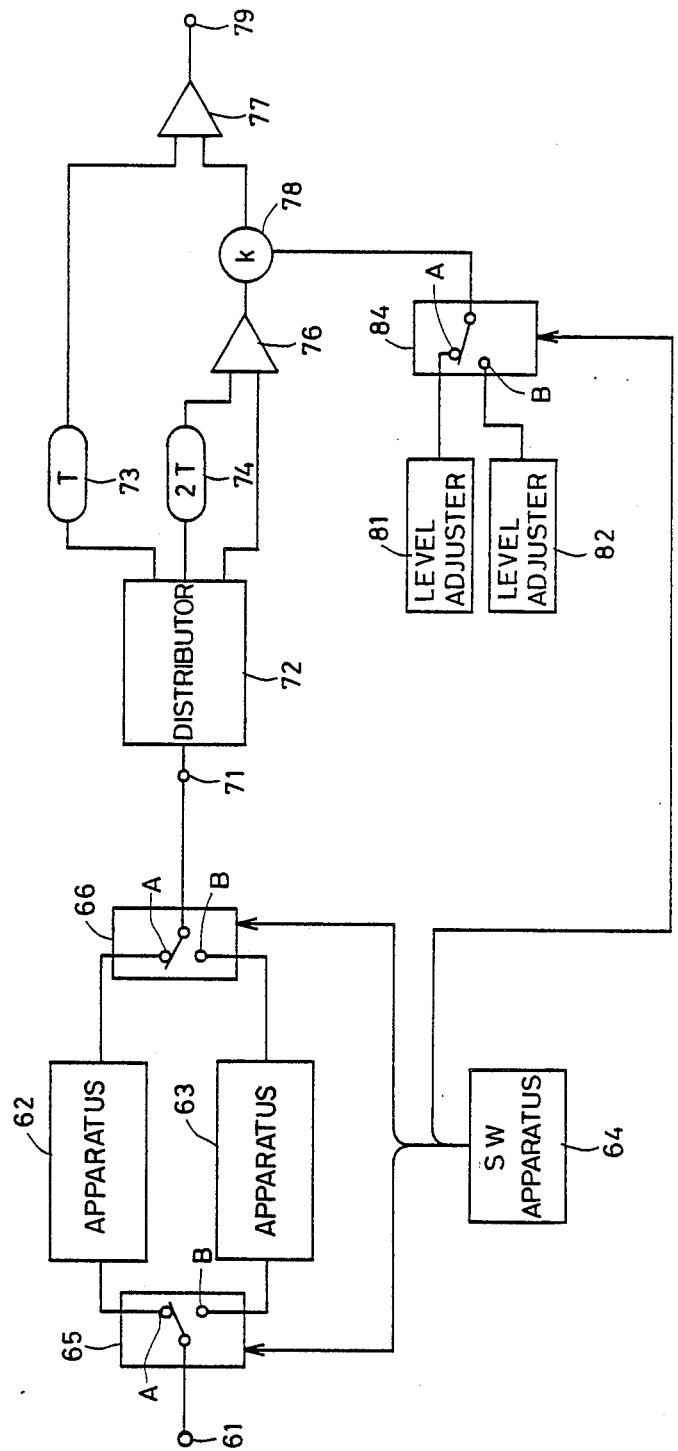
FIG. 14 is a block diagram showing an equalizer of a sixth embodiment of the present invention.

Furthermore, as shown in FIG. 14 the equalizer may control the selection switch 84 by a selection signal from another apparatus instead of the hopping control signal which changes cyclically. Referring to FIG. 14, the signal applied to the input terminal 61 is received by an A apparatus 62 or a B apparatus 63 selected by the selection switch 65 operated by the switching apparatus 64. The switching apparatus 64 further controls, at the same time, the operation of the selection switch 66 and the operation of the selection switch 84. More specifically, the selection switches 65, 66 and 84 are controlled by the switching apparatus 64 so that the switch contacts A or B of those switches are simultaneously selected. Consequently, the signal inputted to the A apparatus 62 is applied to the input terminal 71 of the equalizer through the selection switch 66. A preferred control level voltage corresponding to the characteristic of the A apparatus 62 is set in the level adjuster 81. A preferred control level voltage corresponding to the characteristics of the B apparatus 63 is set in the level adjuster 82. Accordingly, the signal applied to the input terminal 71 of the equalizer through the A apparatus 62 is controlled by the coefficient applying circuit 78 cotrolled by the set voltage of the level adjuster 81. On the other hand, the signal applied through the B apparatus 63 is changed by the coefficient applying circuit 88 based on the voltage set in the level adjuster 82.

Thus, the selection switch 84 can be operated by a non cyclical control by another circuit instead of the cyclical control by the hopping control signal.

In FIG. 14, the same or corresponding components as in FIG. 6 are also denoted in principle by the same reference numerals.

Figure 15:
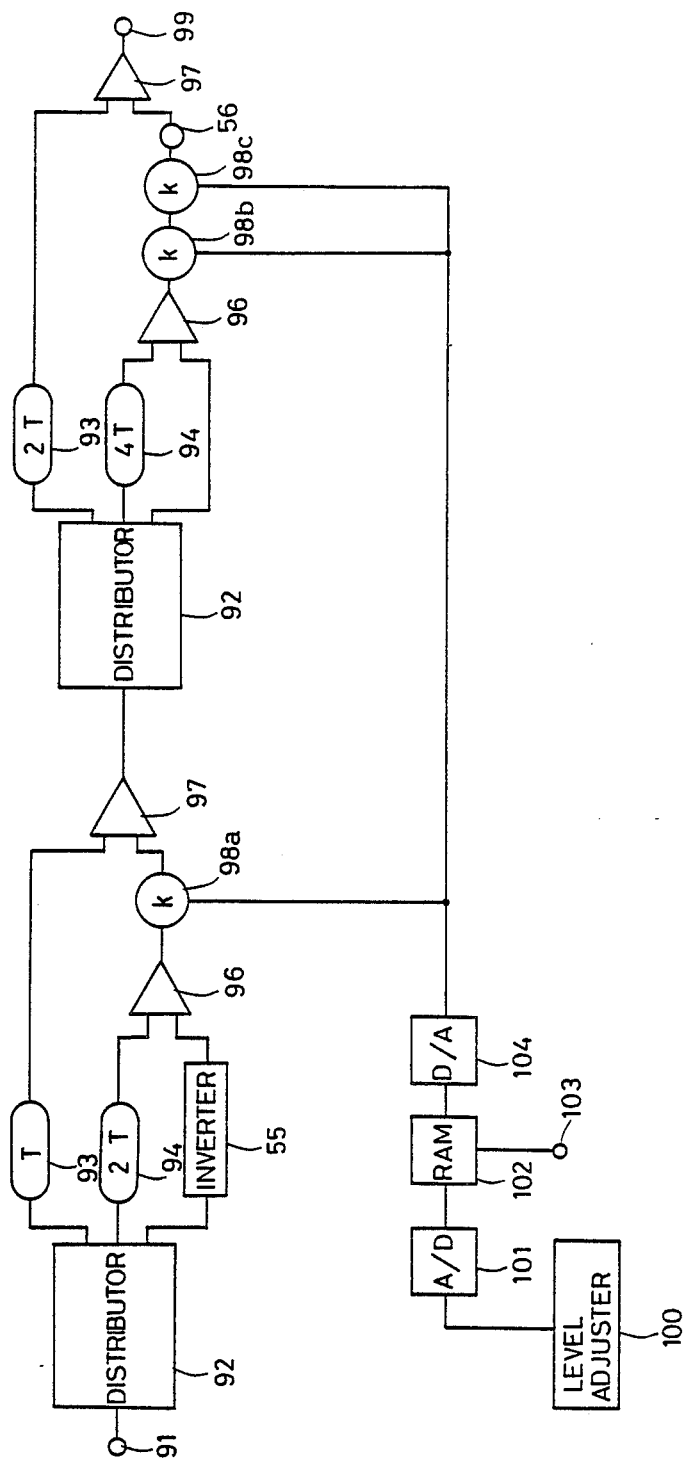
FIG. 15 is a circuit block diagram showing an equalizer of a seventh embodiment of the present invention.
Figure 16:
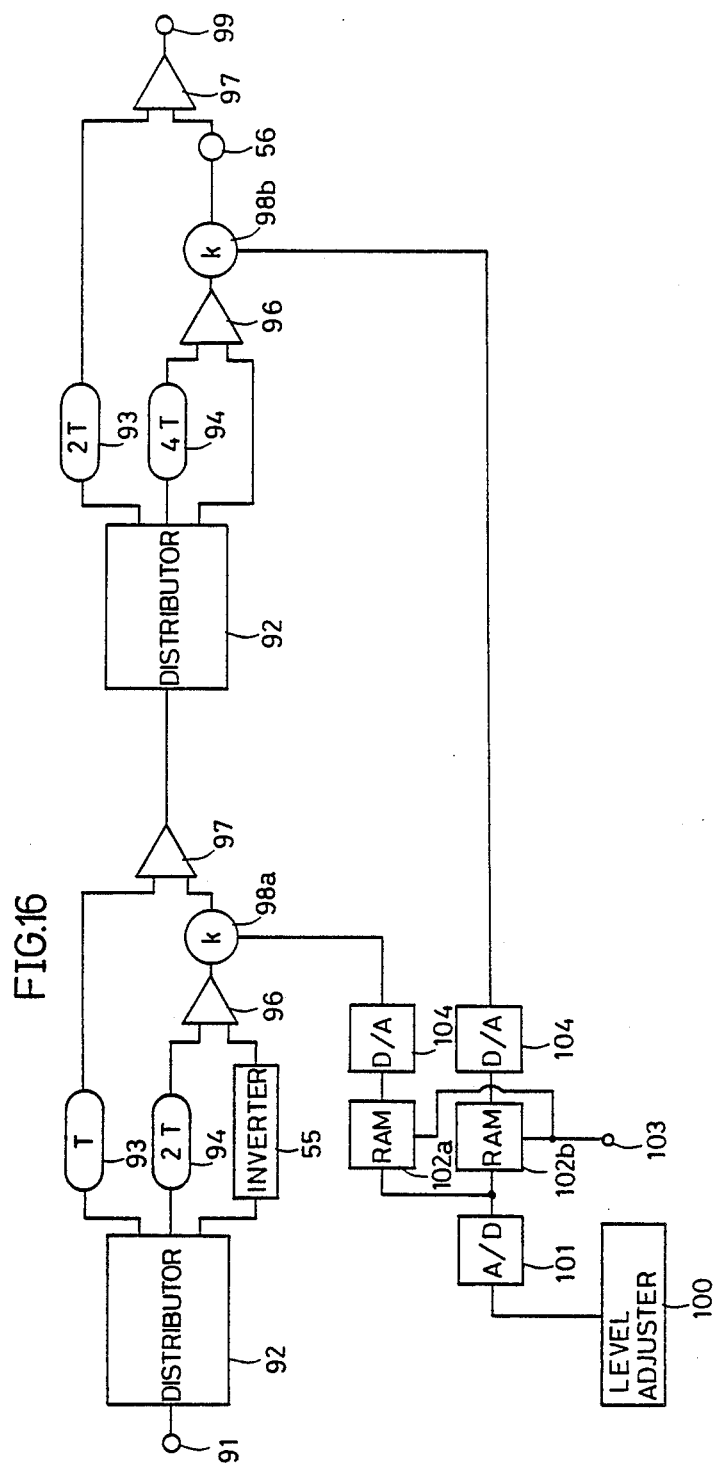
FIG. 16 is a circuit block diagram showing an equalizer of an eighth embodiment of the present invention.

FIG. 15 shows a further example of an equalizer in accordance with an embodiment of the present invention. In this embodiment, a plurality of coefficient applying circuits 98a, 98b and 98c are controlled simultaneously. In addition, FIG. 16 shows a further example in which RAMs 102a and 102b having different data stored therein are provided and coefficient applying circuits 98a and 98b are controlled simultaneously by different control voltages.

Figure 17:
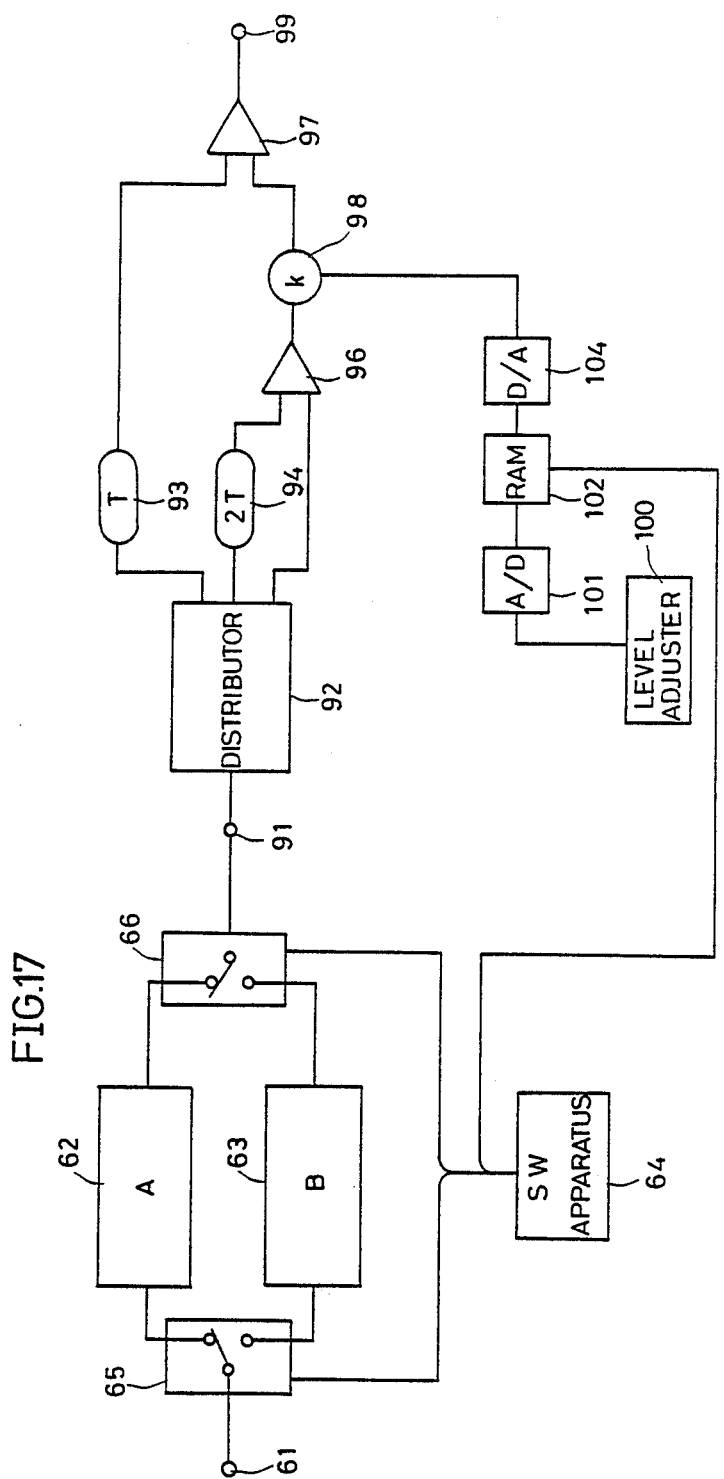
FIG. 17 is a circuit block diagram showing an equalizer of a ninth embodiment of the present invention.

Furthermore, as shown in FIG. 17, an equalizer using a RAM 102 can also be adapted to control the addresses of the RAM 102 based on a non cyclical selection signal from another apparatus instead of the hopping control signal. Referring to FIG. 17, the signal applied to the input terminal 61 is received by the A apparatus 62 or the B apparatus 63 selected by the selection switch 65 operated by the switching circuit 64. The switching circuit 64 controls, at the same time, the operation of the selection switch 66 and the addressing (designation of addresses) of the RAM 102. More specifically, the selection switches 65 and 66 and the RAM 102 are controlled by the switching circuit 64 so that prescribed contacts and a prescribed address are selected simultaneously. Consequently, the signal received by the A apparatus 62 is applied to the input terminal 91 of the equalizer through the selection switch 66. At this time, a preferred control level voltage corresponding to the characteristics of the A apparatus 62 is set in the address 1 of the RAM 102 and a preferred control level voltage corresponding to the characteristics of the B apparatus 63 is set in the address 2 of the RAM 102. Accordingly, the signal applied to the input terminal 91 of the equalizer through the A apparatus 62 is controlled by the coefficient applying circuit 8 operated by the set voltage in the address 1 of the RAM 102. On the other hand, the signal applied through the B apparatus 63 is changed by the coefficient applying circuit 88 operated based on the set voltage in the address 2 of the RAM 102.

Thus, the addressing in the RAM 102 can be made by a non cyclical control by another circuit instead of the cyclical control by the hopping control signal. In FIGS. 15, 16 and 17, the same or corresponding components as in the equalizer in FIG. 9 are denoted in principle by the same reference numerals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An equalizing circuit (20) interposed in a signal transmission line for changing the characteristics of a transmitted signal to desired characteristics, comprising:

equalizing means (70, 90) for changing a plurality of serially input burst signals by providing thereto plural predetermined characteristics in a time division manner, signal distributing means (23) for distributing said signals changed by said equalizing means (70, 90) to a desired number of paths, and switching means (25a, 25b, 25c) coupled to respective output terminals of said signal distributing means (23) for turning on and off in synchronism with the operation of said equalizing means (70, 90), said equalizing means and said switching means responsive to a hopping control signal to provide to said burst signals different equalizing characteristics for different switched connections.

2. An equalizing circuit in accordance with claim 1, wherein, said signal transmission line is a signal transmission line in a time division multiplex access system.

3. An equalizing circuit in accordance with claim 1, wherein said equalizing means (70, 90) comprises coefficient applying means (78, 98) for applying a coefficient to an input signal thereby to change the characteristics of said input signal, and selection means (84, 88, 102, 103) for selecting said coefficient in a time dividing manner.

4. An equalizing circuit in accordance with claim 3, wherein said selecting means (84, 88, 102, 103) comprises coefficient setting means (81, 82, 83, 102) for setting a plurality of coefficients and means (84, 88, 103) for supplying selectively said coefficients set by said setting means (81, 82, 83, 102) to coefficient applying means (78, 98).

5. An equalizing circuit in accordance with claim 4, wherein said coefficient setting means comprises a plurality of level adjusters (81, 82, 83) for setting different coefficients.

6. An equalizing circuit in accordance with claim 4, wherein said coefficient setting means comprises storage means (102) for storing a plurality of coefficients.

7. An equalizing circuit in accordance with claim 6, wherein said storage means comprises a random access memory (102).

8. A single equalizer (70, 90) interposed in a signal transmission line of a TDMA system for compensating characteristics of a plurality of burst signals transmitted on a single line, comprising:

coefficient applying means (78, 98) for applying a coefficient to provide a predetermined equalization for said transmitted signal, coefficient setting means (81, 82, 83, 102) for setting a plurality of coefficients of said equalizer to different predetermined values for different time periods of said TDMA system, and coefficient selecting means (84, 83, 103) for selectively providing to said coefficient applying means the coefficients set by said coefficient setting means in accordance with a hopping signal of the TDMA system.

9. An equalizer in accordance with claim 8, wherein said coefficient setting means comprises a plurality of level adjusters (81, 82, 83) for setting different signal levels.

10. An equalizer in accordance with claim 9, wherein said coefficient selecting means comprises switching means (84, 88) connected between said respective level adjusters and said coefficient applying means for selecting any of said level adjusters thereby to apply the signal level of the selected level adjuster to said coefficient applying means (78).

11. An equalizer in accordance with claim 10, wherein said switching means (84) comprises
        selection switches (85, 86, 87), and
        hopping control means (88) for controlling cyclically the selection timing of said selection switches.

12. An equalizer in accordance with claim 8, wherein said coefficient setting means comprises storage means (102) for storing plurality of signals.

13. An equalizer in accordance with claim 12, wherein said storage means is capable of rewriting the stored content.

14. An equalizer in accordance with claim 12, wherein said coefficient selecting means comprises
        read control means for reading the signals stored in said storage means, and
        hopping control means for successively designating read addresses in said read control means with a prescribed cycle.

15. In a TDMA system, the improvement comprising:

a hopping equalizer means receiving a sequence of signal bursts, said hopping equalizer means responsive to a hopping control signal for changing a characteristic thereof to equalize each of the signal bursts received thereby, and plural hopping switch means receiving an output of said hopping equalizer means, said plural hopping switch means responsive to said hopping control signal for passing a sequence of signal bursts equalized by different equalization characteristics of said hopping equalizer means in a time division manner on a plurality of outputs.

16. An improved TDMA system as recited in claim 15 wherein said hopping equalizer means includes a voltage controlled coefficient generating means, a plurality of voltage level adjusting means, and a selection switch means for selectively connecting one of said plurality of level adjusting means to said voltage controlled coefficient generating means, said selection switch means responsive to said hopping control signal for connecting different ones of said level adjusting means to said coefficient generating means, thereby providing to said hopping equalizer means different equalizing characteristics at different time periods of said TDMA system in response to said hopping control signal.

17. An improved TDMA system as recited in claim 16 wherein said hopping equalizer means is provided at an input of a distributor means providing an output of said hopping equalizer means to each of said hopping switch means.

18. An improved TDMA system as recited in claim 15 wherein said hopping equalizer means includes a voltage controlled coefficient generating means, storage means for storing plural voltage values in different addresses thereof, said storage means responsive to said hopping control signal for reading stored voltage values from said different addresses; and means for providing said voltage values from said storage means to said coefficient generating means, thereby providing to said hopping equalizer means different equalizing characteristics at different time periods of said TDMA system in response to said hopping control signal.

19. An improved TDMA system as recited in claim 18 wherein said hopping equalizer means is provided at an input of a distributor means providing an output of said hopping equalizer means to each of said hopping switch means.

20. An improved TDMA system as recited in claim 15 wherein said hopping equalizer means comprises an analog equalizing means for providing analog equalization of signal characteristics.

* * * * *